US008650620B2

(12) United States Patent  
Chawla et al.

(10) Patent No.: US 8,650,620 B2  
(45) Date of Patent: Feb. 11, 2014

(54) METHODS AND APPARATUS TO CONTROL PRIVILEGES OF MOBILE DEVICE APPLICATIONS (75) Inventors: Deepak K. Chawla, Ocean, NJ (US); Urs A. Muller, Keyport, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 85 days.

(21) Appl. No.: 12/973,665

(22) Filed: Dec. 20, 2010

(65) Prior Publication Data

US 2012/0159578 A1    Jun. 21, 2012

(51) Int. Cl.  
H04L 29/00    (2006.01)

(52) U.S. Cl.  
USPC ................... 726/4; 726/18; 726/21

(58) Field of Classification Search  
USPC ................................. 455/410, 411  
See application file for complete search history.

(56) References Cited

U.S. PATENT DOCUMENTS

| | | | |
|---|---|---|---|
| 6,223,291 B1 | 4/2001 | Puhl et al. | |
| 6,980,660 B1 | 12/2005 | Hind et al. | |
| 7,444,508 B2 * | 10/2008 | Karjala et al. | 713/156 |
| 7,448,080 B2 | 11/2008 | Karjala et al. | |
| 7,512,802 B2 | 3/2009 | Minemura | |
| 7,529,929 B2 * | 5/2009 | Asokan et al. | 713/161 |
| 7,761,703 B2 | 7/2010 | Little et al. | |
| 7,900,048 B2 | 3/2011 | Andersson | |
| 2003/0196114 A1 | 10/2003 | Brew et al. | |
| 2006/0209821 A1 | 9/2006 | Jung et al. | |
| 2007/0079113 A1 | 4/2007 | Kulkarni et al. | |
| 2008/0034419 A1 | 2/2008 | Mullick et al. | |
| 2008/0274716 A1 | 11/2008 | Fok et al. | |
| 2009/0205037 A1 | 8/2009 | Asakura | |
| 2009/0222903 A1 | 9/2009 | Sherkin et al. | |
| 2009/0245184 A1 | 10/2009 | Torres et al. | |
| 2009/0254753 A1 | 10/2009 | De Atley et al. | |
| 2009/0254993 A1 | 10/2009 | Leone | |
| 2009/0271844 A1 * | 10/2009 | Zhang et al. | 726/2 |
| 2010/0031324 A1 | 2/2010 | Strich et al. | |
| 2010/0162240 A1 * | 6/2010 | Zhang et al. | 718/1 |
| 2010/0205436 A1 | 8/2010 | Pezeshki | |
| 2010/0250948 A1 | 9/2010 | Little et al. | |
| 2011/0202755 A1 | 8/2011 | Orsini et al. | |
| 2011/0239270 A1 | 9/2011 | Sovio et al. | |

(Continued)

OTHER PUBLICATIONS

"Hardware Abstraction Layer," Wikipedia, http://en.wikipedia.org/wiki/Hardware_abstraction_layer, accessed on Jul. 3, 2011, 2 pages.

(Continued)

*Primary Examiner* — Jeffrey Pwu  
*Assistant Examiner* — Helai Salehi  
(74) *Attorney, Agent, or Firm* — Hanley, Flight & Zimmerman, LLC (57) ABSTRACT

Methods and apparatus to control privileges of mobile device applications are disclosed. A disclosed example method includes assigning a process identifier to an application on a mobile device, the process identifier generated by an operating system of the mobile device, determining via a digital certificate that the application is authorized to be executed on the mobile device and that the application is authorized to access a network interface of the mobile device, configuring a mandatory access control module of the mobile device to enforce access of the network interface by providing the process identifier to the mandatory access control module, and enabling the application to access the network interface.

17 Claims, 5 Drawing Sheets

(56) References Cited

U.S. PATENT DOCUMENTS

| | | |
|---|---|---|
| 2012/0002814 A1 | 1/2012 | Wei et al. |
| 2012/0185863 A1 | 7/2012 | Krstic et al. |
| 2012/0246731 A1 | 9/2012 | Blaisdell et al. |
| 2012/0297187 A1 | 11/2012 | Paya et al. |
| 2013/0042295 A1 | 2/2013 | Kelly et al. |
| 2013/0054962 A1 | 2/2013 | Chawla et al. |
| 2013/0055347 A1 | 2/2013 | Chawla et al. |

OTHER PUBLICATIONS

"Virtual Interface," Wikipedia, http://en.wikipedia.org/wikiNirtual_interface, accessed on Jul. 3, 2011, 2 pages.

United States Patent and Trademark Office, "Non-final Office Action," issued in connection with U.S. Appl. No. 13/222,189, Nov. 26, 2012, 74 pages.

United States Patent and Trademark Office, "Non-final Office Action," issued in connection with U.S. Appl. No. 13/222,184, Mar. 20, 2013, 46 pages.

United States Patent and Trademark Office, "Final Office Action," issued in connection with U.S. Appl. No. 13/222,189, Jul. 17, 2013, 31 pages.

United States Patent and Trademark Office, "Final Office Action," issued in connection with U.S. Appl. No. 13/222,184, Jul. 17, 2013, 26 pages.

United States Patent and Trademark Office, "Non-Final Office Action," issued in connection with U.S. Appl. No. 13/222,189, Nov. 13, 2013, 31 pages.

United States Patent and Trademark Office, "Non-Final Office Action," issued in connection with U.S. Appl. No. 13/222,184, Nov. 21, 2013, 28 pages.

* cited by examiner

METHODS AND APPARATUS TO CONTROL PRIVILEGES OF MOBILE DEVICE APPLICATIONS

FIELD OF THE DISCLOSURE

This disclosure relates generally to mobile devices and, more particularly, to methods and apparatus to control privileges of mobile device applications.

BACKGROUND

Mobile device security is becoming increasingly important with increases in the spread of malicious applications or other fraudulent code (e.g., malware) targeted towards mobile devices. Many mobile devices also include functionality that enables the mobile devices to connect to more than one type of wireless network. For example, a mobile device with cellular functionality and WiFi functionality may connect to a cellular wireless network and/or a WiFi wireless network. In this example, some applications on the mobile device (e.g., voice communications, global positioning system (GPS)-related applications, service provider-related functions) may connect to the cellular network while other applications (e.g., web browsing, text messaging, media streaming) may connect to the WiFi network. In some examples, the applications on a mobile device may access a wireless network without a user knowing which wireless network the applications are utilizing.

DETAILED DESCRIPTION

Example methods, articles of manufacture, and apparatus to control privileges of mobile device applications are disclosed. A disclosed example method includes assigning a process identifier to an application on a mobile device, the process identifier generated by an operating system of the mobile device. The example method also includes determining via a digital certificate that the application is authorized to be executed on the mobile device and that the application is authorized to access a network interface of the mobile device. The example method further includes configuring a mandatory access control module of the mobile device to enforce access of the network interface by providing the process identifier to the mandatory access control module. The example method then enables the application to access the network interface.

A disclosed example apparatus includes a certificate processor to determine via a digital certificate that an application on a mobile device is authorized to access a network interface of the mobile device. The apparatus further include a policy processor to configure a mandatory access control module of the mobile device to enforce access of the network interface by providing the process identifier to the mandatory access control module.

Mobile device security is becoming important as software worms, viruses, and other malicious code is designed to target mobile devices. Mobile devices include, for example, any laptop, smartphone, cellular phone, computing pad, personal digital assistant, tablet personal computer, personal communicator, etc. Because many mobile devices have relatively small memories, these mobile devices typically do not include anti-malware protection. However, many mobile devices are primarily used to access data and/or communications from servers via a wireless network. In some instances, malicious code may be embedded within data, which then penetrates an operating system of a mobile device. In many instances, malicious code can expose sensitive information stored on a mobile device. In other instances, malicious code can use the mobile device as a launching pad to propagate to other mobile devices. In yet other instances, the malicious code may use the mobile device as a host to perform denial of service attacks on web servers and/or wireless networks.

To prevent and/or limit a mobile device from receiving malicious code, some mobile devices include a VPN client that encrypts, keys, and/or authenticates data and/or communication transmissions through a wireless network. In many instances, a mobile device uses a VPN client to create a secure connection to a host server located in a private enterprise network or a carrier network (e.g., a wireless network). The VPN client establishes a relatively secure virtual tunnel and/or virtual circuit from a mobile device to a host server and/or network.

However, there are some known issues with current VPN clients that expose mobile devices to malicious code. In some instances, malicious code can bypass a VPN client on a mobile device. For example, some mobile devices are configured to connect to more than one wireless network. These mobile devices grant applications access to connect (e.g., communicatively couple) to the wireless networks via corresponding wireless hardware interfaces. In many of these instances, the mobile devices may enable any application to connect to a wireless network without prompting a user for permission. In these instances, a malicious application may bypass a VPN connecting to a first wireless network and connect to a second wireless network. The malicious application can bypass the VPN and any corresponding firewalls on the mobile device by, for example, accessing the second wireless network at the link layer of the mobile device (e.g., an application programming interface (API) for processing network traffic).

In other instances, user installed applications may not be configured to access a wireless network through a VPN client. A malicious application may use the connections of these applications to bypass the VPN. Additionally, some mobile device users may disable and/or uninstall VPN clients, thereby exposing the mobile devices to potentially malicious code. In yet other instances, malicious applications and/or code can utilize tools and/or components that are used by VPN clients to protect a mobile device. The malicious applications can utilize the tools and/or components to connect to a wireless network in parallel with the VPN client, thereby bypassing the security of the VPN client.

The example methods, apparatus, and articles of manufacture described herein integrate an App (e.g., application) Policy Engine with a kernel of an operating system of a mobile device to control which application on the mobile device can be executed and/or to control which of the applications are authorized to access device interfaces and/or network interfaces of the mobile device. The example methods, apparatus, and articles of manufacture described herein interact with an application execution manager of an operating system, a certificate validation processor, and/or a mandatory access control (MAC) module to enforce execution of device and/or network interface access policies. Thus, the example methods, apparatus, and articles of manufacture described herein block applications and/or services that are not authorized and/or certified from accessing security sensitive interfaces including, for example, a wireless network, a VPN, and/or host service platform.

The example methods, apparatus, and articles of manufacture described herein restrict application execution and/or restrict application access to device and/or network interfaces by assigning a process identifier to each application and/or service on a mobile device. The example methods, apparatus, and articles of manufacture use the process identifiers to determine if each of the applications is authorized to be executed on the mobile device and/or to access requested device interfaces and/or network interfaces. The example methods, apparatus, and articles of manufacture described herein determine which applications and/or services are authorized to be executed on the device by checking a digital application certificate provided by a certificate authority.

A certificate authority may provide a digital certificate for each application or, alternatively, provide a digital certificate for each of the authorized applications on a mobile device. A list of certificate authorities that are recognized by a mobile device as valid authorities to sign applications may be preconfigured and/or hard coded into the example App Policy Engine. Alternatively, the list of certificate authorities may be provided through a network via a local memory module of the mobile device such as, for example, a Subscriber Identity Module (SIM) card. In examples where a digital certificate is assigned to each application, the example methods, apparatus and articles of manufacture described herein use the digital certificate to identify that the corresponding application is authorized to be executed on the mobile device. The digital certificate may also indicate which device interfaces and/or network interfaces of the mobile device the application is authorized to access.

An application, service, and/or function on a mobile device includes any software and/or firmware routine and/or algorithm that performs a function within a mobile device. An application and/or a service includes, for example, a messaging application, an e-mail service, a social network application, a gaming application, a web browsing application, a word processing application, a database management application, etc. When an authorized application is executed on a mobile device, the example App policy engine configures the example MAC module to grant only the application access to device interface(s) and/or network interface(s) on the mobile device. In this manner, the example App Policy Engine manages which applications with process identifiers are granted permission to interfaces of the mobile device. The example MAC module may then enable authorized applications and/or services to access the device and/or network interfaces and block and/or restrict unauthorized applications from accessing those interfaces.

A MAC module provides access control between an operating system layer and device interfaces (e.g., an interface to a camera, a microphone, a memory card, etc.) and/or network interfaces (e.g., network interface cards (NICs)) of a mobile device. Network interfaces may be communicatively coupled to a network and/or server. By providing access control, a MAC module determines which applications and/or services may transmit and/or receive data from networks and/or servers via the network interfaces. By providing a MAC module with a list of authorized applications for a network that identifies which device and/or network interfaces the applications are authorized to access, the example methods, apparatus, and articles of manufacture described herein create a controlled environment for application execution and/or application access to device and/or network interfaces, thereby preventing unauthorized applications from being executed on a mobile device and/or from applications improperly accessing the device and/or network interfaces. In this manner, the example methods, apparatus, and articles of manufacture described herein ensure that application execution and/or device and/or network interface access privileges correspond to specified polices of a certificate authority.

The example methods, apparatus, and articles of manufacture described herein also enable applications and/or services that are authorized and/or certified (e.g., signed) in a digital certificate by a host service platform (e.g., a certificate authority) to access physical network interfaces of a network, thereby blocking malicious and/or unauthorized applications from executing on a mobile device. Further, the example methods, apparatus, and articles of manufacture described herein permit exclusive privileges to be granted to a specific application (e.g., a VPN client). By granting relative higher privileges to, for example, a VPN client, other applications with relatively lower privileges have to abide by the privileges granted to the VPN client. For example, a VPN client may have exclusive authorized access to a wireless network interface. Other certified and/or authorized applications on the mobile device with relatively lower privileges are forced to go through the VPN to obtain access to the wireless network.

In the interest of brevity and clarity, throughout the following disclosure, reference will be made to an example wireless environment 100 of FIG. 1. However, the methods, articles of manufacture, and apparatus described herein to control mobile device application access to wireless networks are applicable to other types of networks constructed using other network technologies, topologies and/or protocols.

Figure 1:
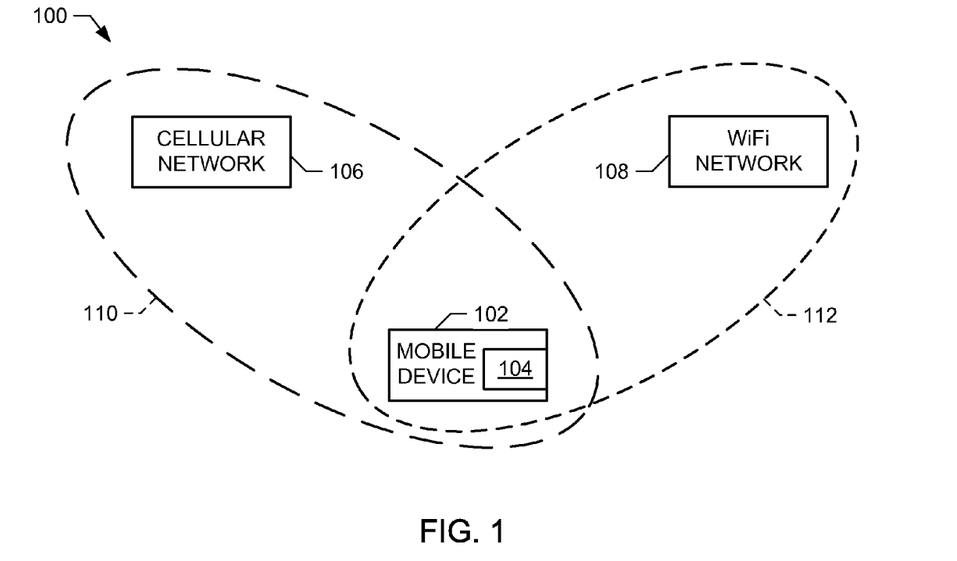
FIG. 1 is a schematic illustration of an example wireless environment that includes a mobile device with an App Policy Engine.

FIG. 1 shows a schematic illustration of the example wireless environment 100 that includes a mobile device 102 with an App Policy Engine 104. The mobile device 102 may include any type of wireless and/or mobile device capable of communicatively coupling to a wireless network including, for example, a laptop, a smartphone, a cellular phone, a computing pad, a personal digital assistant, a tablet personal computer, and/or a personal communicator. In other examples, the mobile device 102 may include any type of computing device that can communicatively couple to a wireless and/or a wired network including, for example, a workstation, a personal computer, a server, and/or a processor. While FIG. 1 shows the mobile device 102, in other examples, FIG. 1 may include additional mobile devices.

In the illustrated example, the mobile device 102 is capable of communicatively coupling to a cellular network 106 and a WiFi network 108. The example networks 106 and 108 include any number and/or types of routers, switches, servers, etc. to enable communications (e.g., packet-based data) between the mobile device 104 and a packet switched network (e.g., the Internet). Further, the networks 106 and 108 may utilize and/or conform to any routing and/or communication protocols. For example, the cellular network 106 may include components, network elements, and/or controllers that conform to the 3rd Generation Partnership Project (3GPP) Long Term Evolution (LTE) wireless communication standard, the General Packet Radio Service (GPRS) for second generation (2G) protocol, the Wideband-Code Division Multiple Access (W-CDMA)-based third generation (3G) protocol, the Universal Mobile Telecommunication System (UMTS) protocol, and/or the Global System for Mobile Communications (GSM) protocol. In other examples, the wireless environment 100 may include other wireless protocols compatible with the mobile device 102 including, for example, Bluetooth IP and/or IEEE 802.11 wireless local area network (WLAN).

In the example of FIG. 1, the example mobile device 102 is within a coverage area 110 of the cellular network 106 and a coverage area 112 of the WiFi network 112. By being within the coverage areas 110 and 112, applications within the mobile device 102 may communicatively couple to either of the wireless networks 106 and 108. To manage which of the wireless networks 106 and 108 the applications may access, the example mobile device 102 includes the App Policy Engine 104.

In many known examples, a mobile device without the App Policy Engine 104 may establish a VPN link to a VPN within, for example, the cellular network 106. In these known examples, applications that are configured to connect to the VPN on the mobile device may transfer data with the VPN. However, other applications (including malicious code) may bypass the VPN and access the WiFi network 108. By being able to bypass the VPN, applications may transfer data through the WiFi network 108 to known and/or unknown destinations without a user of the mobile device 102 knowing of the connection to the WiFi network 108.

The example App Policy Engine 104 establishes a VPN tunnel within the mobile device 102 so that application access to the cellular network 106 is restricted at the device interface and/or the network interface (e.g., NIC) level. By restricting application access to the hardware interface level (e.g., locking a physical interface of the mobile device 102), a MAC module within the mobile device 102 can determine which applications are to be granted access to a VPN within the cellular network 106 and which applications are to be blocked and/or not granted access to the VPN. In this manner, the example App Policy Engine 104 ensures that only authorized applications are able to connect to a network while preventing unauthorized applications from transmitting and/or receiving data.

Figure 2:
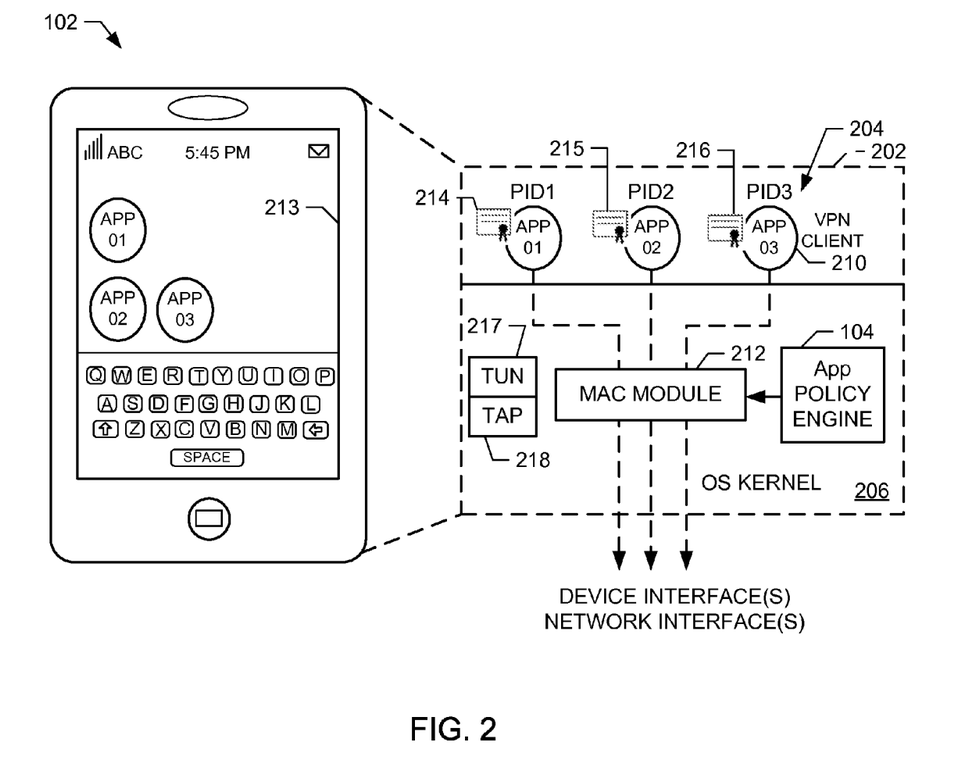
FIG. 2 shows the example mobile device of FIG. 1 including the example App Policy Engine of FIG. 1 implemented within a device operating system (OS) platform.

FIG. 2 shows the example mobile device 102 of FIG. 1 including the example App Policy Engine 104 of FIG. 1 implemented within a device OS platform 202. The device OS platform 202 includes layers 204-206 for operating applications APP 01-03 within the mobile device 102. In other examples, the mobile device 102 and/or the device OS platform 202 may include additional or fewer applications. The example device OS platform 202 of the illustrated example may be implemented in any type of operating system including, for example, Microsoft Windows compatible systems, Mac OS compatible systems, and/or Linux compatible systems.

The application layer 204 includes software and/or firmware routines, algorithms, and/or programs that are configured to perform at least one predetermined function. In the illustrated example, the application layer 204 includes the applications APP 01-03. In this example, APP 03 is a VPN client 210 and the applications APP 01-02 may include any type of software application.

The example VPN client 210 within the application layer 204 enables the applications APP 01-02 to securely communicatively couple to a VPN within, for example, the cellular network 106. Through the exchange of encrypted registration messages with a VPN, the example VPN client 210 establishes a virtual connection (e.g., a virtual circuit) through a public network (e.g., the wireless network 106). The VPN client 210 uses this virtual connection to relatively securely transmit and receive data from servers, processors, and/or computers within a private network of a host service platform connected to the VPN. In this manner, the applications APP 01-02 may transmit and/or receive data securely with a VPN via the VPN client 210 and a MAC module 212.

In the example of FIG. 2, the mobile device 102 includes a user interface 213 for displaying the applications APP 01-03 including the VPN client 210. A user of the mobile device 102 may connect to a VPN by selecting the VPN client 210 (or an icon representing the VPN client 210) displayed within the user interface 213. A user may execute the certified applications APP 01-02 to transmit and/or receive data from a VPN by selecting the applications APP 01-02 (or an icon representing the applications APP 01-02) displayed within the user interface 213.

To connect to a VPN, each of the applications APP 01-03 includes respective digital certificates 214-216 (e.g., an application, and/or electronic certificate). The example digital certificates 214-216 certify that the certificates 214-126 belong to a user, organization, server, and/or other entity. The digital certificates 214-216 may also be used to establish an encryption scheme and/or security protocol with a VPN. The VPN client 210 connects to a VPN by transmitting the certificate 216 to a VPN authorization agent that grants access to a VPN. The VPN authorization agent verifies the credentials within the certificate 216 and provides the VPN client 210 access to a VPN. After establishing a connection to a VPN, the VPN client 210 encrypts data from the applications APP 01-02 to transmit to the VPN and decrypts data from the VPN for the applications APP 01-02. In many instances, the digital certificates 214-216 are provided by a certificate authority and/or an administrator of a VPN.

In the example of FIG. 2, the digital certificates 214-216 includes a list of device interfaces and/or network interfaces that are authorized to be accessed by the applications APP 01-03. In some examples, a certificate authority and/or a network administrator may only allow certain applications and/or certain types of applications to access device and/or network interfaces. A VPN administrator and/or a certificate authority may only allow certain applications that have trusted security properties, applications that are business appropriate, and/or applications that are relevant to the purpose of a VPN. For example, a network administrator may specify in the certificates 214 and 216 that the application APP 01 and the VPN client 210 are authorized to access a VPN via a network interface. Further, the network administrator may specify within the digital certificate 216 that the VPN client 210 is to have relatively greater privileges to access network interfaces and specify within the certificates 214 and 215 that the applications APP 01-02 are to have relatively fewer privileges to access network interfaces. The relatively fewer privileges may cause the applications APP 01-02 to go through the VPN client 210 to access the network interfaces.

In other examples, a user of the mobile device 102 may request from a VPN administrator and/or a certificate authority that certain applications are to have access to a VPN. For example, a user may request to have a digital certificate (e.g., the digital certificate 215) assigned to the application APP 02 by sending a request to a certificate authority. The certificate authority may respond by providing the digital certificate 215 to reflect that the application APP 02 is authorized to access a VPN. Alternatively, a VPN administrator and/or a certificate authority may assign a single digital certificate that specifies which of the applications APP 01-03 may be executed on the mobile device 102 and/or specify which interfaces the applications APP 01-03 may access.

The example operating system (OS) kernel layer 206 provides services to execute the applications APP 01-02 and the VPN client 210 within the application layer 204. For many hardware functions (e.g., input functions, output functions, memory allocation, and/or wireless communication functions) of the mobile device 102, the OS kernel layer 206 functions as an interface so that the hardware functions are interpreted properly by the applications APP 01-02 and the VPN client 210. The example OS kernel layer 206 includes the App Policy Engine 104 for interfacing between the VPN client 210 and the MAC module 212.

The example OS kernel layer 206 may also bridge (e.g., interface) the application layer 204 with a hardware layer (not shown) for processing data from the applications APP 01-03. The hardware level includes device interface(s) and network interface(s) of the mobile device 102. The example OS kernel layer 206 in the illustrated example manages data from the application layer 204 for transmission to the networks 106 and 108 via, for example NICs (e.g., wireless network cards). The example OS kernel layer 206 also propagates data received from the networks 106 and 108 to the appropriate applications APP 01-03.

In addition to the MAC module 212, the example OS kernel layer 206 includes a network tunnel 217 and a network tap 218. Together, the example MAC module 212, the example network tunnel 217, and the example network tap 218 operate at the OS kernel level 206 to provide security prior to data reaching the applications APP 01-03 within the application layer 204. While the example OS kernel layer 206 includes the MAC module 212, the network tunnel 217, and the network tap 218, the OS kernel layer 206 may include additional or fewer components to establish and/or manage VPN security.

The example network tunnel (TUN) 217 creates a VPN tunnel through the device OS platform 202 and/or the mobile device 102 by encapsulating data within a packet data payload conforming to a protocol of a packet switched network. In this manner, the network tunnel 217 enables communications to propagate securely from, for example, the VPN client 210 to a destination via a VPN within, for example, the cellular network 106. The example network tunnel 217 may create a virtual circuit and/or a VPN tunnel upon the VPN client 214 receiving permission to connect to a VPN.

The example network tap 218 monitors data propagating within a VPN tunnel to detect a network intrusion from an unauthorized third party. The example network tap 218 may also be used for Voice over Internet Protocol (VoIP) recording tp monitor a Quality of Service (QoS) for a VPN connection. The example network tap 218 may operate in conjunction with the example network tunnel 217 to provide relatively secure data communications through a VPN tunnel.

The example MAC module 212 of FIG. 2 provides access control to hardware interface(s) of the wireless device 102. Specifically, the example MAC module 212 provides access control for the applications APP 01-03 to connect to wireless NICs, which provide a wireless connection to, for example, the wireless networks 106 and 108. The example MAC module 212 may also determine which of the applications APP 01-03 maybe executed and/or operated on the mobile device 102 by restricting unauthorized applications from access device interfaces of the mobile device 102. For example, the MAC module 212 may prevent unauthorized applications from accessing a microphone and enabling authorized telephony applications to access the microphone. In this example, the MAC module 212 prevents any unauthorized applications (e.g., malware) from secretly accessing the microphone and recording, for example, confidential conversations.

In the illustrated example of FIG. 2, the MAC module 212 includes an interface to an NIC configured to connect to the cellular network 106 and an interface to an NIC configured to connect to the WiFi network 108. For example, communications approved by the MAC module 212 for the cellular network 106 are routed through the appropriate cellular interface to the wireless NIC configured for the wireless network 106. In other examples, the MAC module 212 may include additional or fewer interfaces to other hardware interfaces of the wireless device 102.

In the example of FIG. 2, the App Policy Engine 104 configures the MAC module 212 to grant specific applications access to a VPN and/or host service platform via one of the wireless networks 106 and 108. To grant certain applications access, an operating system within the OS layer 206 assigns a unique process identifier to each of the applications APP 01-03. For example, the operating system assigns process identifier PID1 to the application APP 01 and assigns process identifier PID3 to the VPN client 210. The process identifiers PID1-3 are numbers and/or names assigned to the respective applications APP 01-03. An operating system, the MAC module 212, and/or the App Policy Engine 104 may use the process identifiers PID1-3 to locate, identify, and/or access the appropriate applications APP 01-03. In some instances, the process identifiers PID1-3 may be used in a function call to access the applications APP 01-03.

The example App Policy Engine 104 uses the process identifiers PID1-3 as a reference for the MAC module 212 to indicate which of the applications APP 01-03 are authorized to access a VPN. For example, after the process identifiers PID1-3 are assigned to the respective applications APP 01-03, the App Policy Engine 104 checks the digital certificates 214-216 to determine which of the applications APP 01-03 are authorized to access device and/or network interfaces of the mobile device 102. The example App Policy Engine 104 sends an instruction to the MAC module 212 with the process identifiers of the applications APP 01-03 that are authorized to access a VPN. The example MAC module 212 stores the allowed process identifiers to later determine if an application requesting to access a VPN, a wireless network, and/or a host service platform is authorized.

In some examples, the App Policy Engine 104 may provide the MAC module 212 with a list of authorized applications upon the mobile device 102 requesting to connect to a VPN. In other examples, the App Policy Engine 104 may detect that one of the applications APP 01-03 is attempting to transmit data to one of the wireless networks 106 and 108. In response to detecting the attempted transmission, the App Policy Engine 104 determines if the application APP 01 is authorized to access a network interface to transmit the data by checking the certificate 214 and sending an instruction to the MAC module 212 to allow the application APP 01 to access the wireless network 106 and/or 108 if the application APP 01 is authorized. In these other examples, the App Policy Engine 104 provides the MAC module 212 application access permission as each of the applications APP 01-03 attempts to access a network. In yet other examples, the App Policy Engine 104 may provide a list of authorized process identifiers to the MAC module 212 periodically and/or after the VPN client 210 receives updated and/or new digital certificates.

In examples where the mobile device 102 includes more than one VPN client, the App Policy Engine 104 may identify for the MAC module 212 which of the applications APP 01-02 are authorized to access each of the VPNs via respective network interfaces. For example, the application APP 01 may be authorized to access a first VPN via the cellular network 106 and the application APP 02 may be authorized to access a second VPN via the WiFi network 108. In this example, the App Policy Engine 104 instructs the MAC module 212 to allow the application APP 01 to access an NIC for the cellular network 106 and instructs the MAC module 212 to allow the application APP 02 to access an NIC for the WiFi network 108. Thus, the App Policy Engine 104 prevents the MAC module 212 from allowing the application APP 01 to access the VPN on the WiFi network 108 and prevents the MAC module 212 from allowing the application APP 02 from accessing the VPN on the cellular network 106. Further, in examples where more than one VPN client may connect to respective VPNs through, for example, the cellular network 106, the App Policy Engine 104 ensures that the appropriate applications connect to the respective VPNs through the appropriate VPN client by having the MAC module 212 restrict applications from accessing a VPN on the cellular network 106 that are not authorized to access the VPN.

Figure 3:
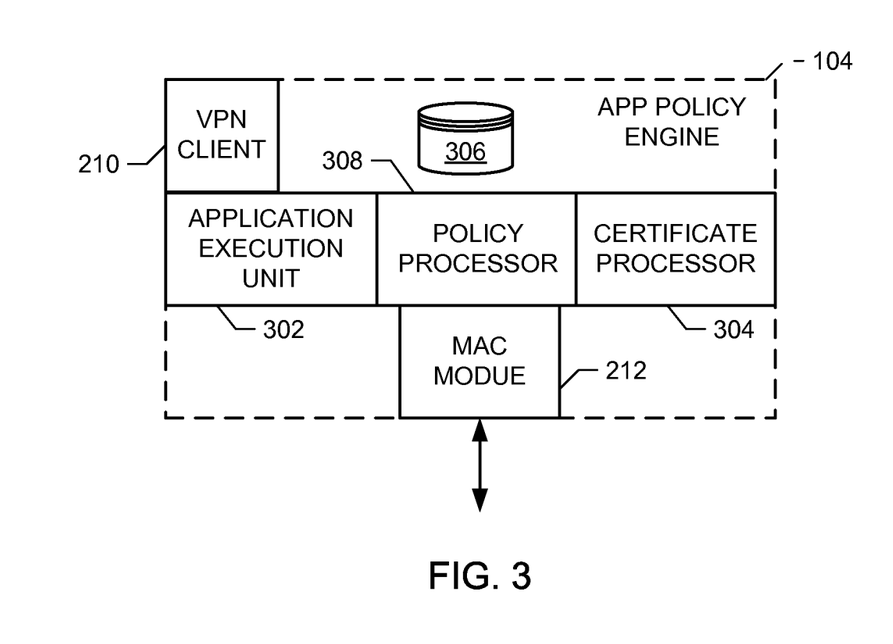
FIG. 3 shows a functional diagram of the example App Policy Engine of FIGS. 1-2.

FIG. 3 shows a functional diagram of the example App Policy Engine 104 of FIGS. 1-2. The example App Policy Engine 104 may be implemented within, for example, the OS kernel layer 206 as described in conjunction with FIG. 2. In other examples, the App Policy Engine 104 may be implemented by any processor, controller, microcontroller, hardware, and/or firmware within the device OS platform 202 and/or within more generally, the mobile device 102. While the MAC module 212 and the VPN client 210 are shown as being included within the App Policy Engine 104, in other examples, the VPN client 210 and/or the MAC module 212 may be external to the App Policy Engine 104.

The example App Policy Engine 104 includes application execution unit 302 to interface within an operating system of the mobile device 102. The example application execution unit 302 also assigns process identifiers (e.g., process IDs) to each of the applications (e.g., the applications APP 01-03) within the mobile device 102. The example MAC module 212 uses the process identifiers to grant and/or restrict application access to device and/or network interfaces of the mobile device 102.

Further, the application execution unit 302 may determine which applications may be executed on the mobile device. For example, the App Policy Engine 104 may receive an indication that an application is attempting to operate and/or initialize. The application execution unit 302 determines if the application is associated with a digital certificate and that indicates the application may be executed. If the digital certificate indicates the application may be executed, the example application execution unit 302 enables the application to operate (e.g., execute) on the mobile device 102.

To identify privileges of applications, the example App Policy Engine 104 includes a certificate processor 304. The example certificate processor 304 requests to access, for example, the certificate 214 stored on the mobile device 102. The certificate processor 304 reads the certificate 214 to determine if the associated application APP 01 is authorized to be executed, access device and/or network interfaces, access a VPN, access a wireless network, and/or access a host service platform. In some instances the certificate processor 304 identifies applications by a name included within a digital certificate and references the name to determine the corresponding application within the application layer 204. In other instances, the certificate processor 304 examines a digital certificate for any other identifying information (e.g., file names, application metadata, application identifiers, etc.) to locate a corresponding application with the application layer 204.

After determining which applications are authorized to be executed, access device and/or network interfaces, access a VPN, access a wireless network, and/or access a host service platform, the example certificate processor 304 stores an identifier of the authorized applications to a database 306. The example certificate processor 304 may create a separate group of authorized applications within the database 306 for each device and/or network interface. Additionally, the certificate processor 304 may group authorized applications within the database 306 based on a relatively amount of granted privileges.

The certificate processor 304 may also query the VPN client 210 for process identifiers assigned to the applications and store the respective process identifiers with the identifiers of the authorized application to the database 306. In this manner, the certificate processor 304 maintains a group of applications that are authorized to be executed, access device and/or network interfaces, access a VPN, access a wireless network, and/or access a host service platform. The database 306 may be implemented by Electronically Erasable Programmable Read-Only Memory (EEPROM), Random Access Memory (RAM), Read-Only Memory (ROM), and/or any other type of memory.

In some examples, the certificate processor 304 may identify applications that are unauthorized to be executed, access device and/or network interfaces, access a VPN, access a wireless network, and/or access a host service platform. In these examples, the certificate processor 304 stores the process identifies of these applications to the database 306. Further, the certificate processor 304 may periodically query the VPN client 210 (and/or a SIM card of the mobile device 102) to determine if new and/or updated versions of digital certificates are available. In other examples, the VPN client 210 may notify the certificate processor 304 that new and/or modified certificates have been received. In instances where digital certificate have been updated and/or replaced, the certificate processor 304 updates the database 306 with identifiers of authorized applications.

To provide the MAC module 212 of FIG. 2 with instructions specifying authorized applications, the example App Policy Engine 104 includes a policy processor 308. The example policy processor 308 of FIG. 3 accesses the database 306 to identify privileges of applications. The example policy processor 308 then configures the MAC module 212 by providing the list of process identifiers that correspond to the authorized applications.

The example policy processor 308 of the illustrated example may provide the MAC module 212 with a list of authorized applications periodically, upon a request to connect to a wireless network, upon a request to execute, upon a request to connect to a VPN, and/or host service platform, upon an application accessing a wireless network, upon powering of the mobile device 102, upon updating of digital certificate(s), and/or upon a request from the MAC module 212. In examples where the MAC module 212 does not include a list of authorized applications, the policy processor 308 responds to queries from the MAC module 212 asking an application is authorized to be executed and/or access device and/or network interfaces of the mobile device 102. In these examples, the policy processor 308 determines which applications are authorized by accessing the database 306 and searching for privileges associated with process identifiers of the applications.

The example policy processor 308 of FIG. 3 communicatively couples the App Policy Engine 104 to the MAC module 212. The example policy processor 308 receives instructions including process identifiers corresponding to authorized applications and transmits the instructions to the MAC module 212. Further, the policy processor 308 may detect that a VPN tunnel has been established via, for example, the VPN client 210. Alternatively, the MAC module 212 may inform the policy processor 308 that a VPN tunnel has been created. In response to the policy processor 308 receiving an indication of a VPN tunnel, the policy processor 308 may transmit instructions to the MAC module 212 providing a list of authorized applications.

In some examples, the VPN client 210 creates a VPN tunnel though the device OS platform 202 to device and/or network interfaces of the mobile device 102 upon detecting and/or receiving an indication that a user has selected to connect to a VPN and/or host service platform. To create a VPN tunnel, the VPN client 210 may instruct the network tunnel 217 to establish a VPN tunnel from the VPN client 210 to a wireless hardware interface of the mobile device 102 via the MAC module 212. The VPN client 210 may also instruct the access controller 408 to send instructions to the MAC module 212 to identify authorized applications that can transmit and/or receive communications via the VPN tunnel.

While the example App Policy Engine 104 has been illustrated in FIG. 3, one or more of the servers, platforms, interfaces, data structures, elements, processes and/or devices illustrated in FIG. 3 may be combined, divided, re-arranged, omitted, eliminated and/or implemented in any way. Further, the example VPN client 210, the example MAC module 212, the example application execution unit 302, the example certificate processor 304, the example database 306, the example policy processor 308 and/or more generally, the example App Policy Engine 104 may be implemented by hardware, software, firmware and/or any combination of hardware, software and/or firmware. Thus, for example, any of the example VPN client 210, the example MAC module 212, the example application execution unit 302, the example certificate processor 304, the example database 306, the example policy processor 308 and/or more generally, the example App Policy Engine 104 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example VPN client 210, the example MAC module 212, the example application execution unit 302, the example certificate processor 304, the example database 306, and/or the example policy processor 308 are hereby expressly defined to include a computer readable medium such as a memory, DVD, CD, etc. storing the software and/or firmware. Further still, the example App Policy Engine 104 may include one or more elements, processes and/or devices in addition to, or instead of, those illustrated in FIG. 3, and/or may include more than one of any or all of the illustrated elements, processes and devices.

Figure 4A:
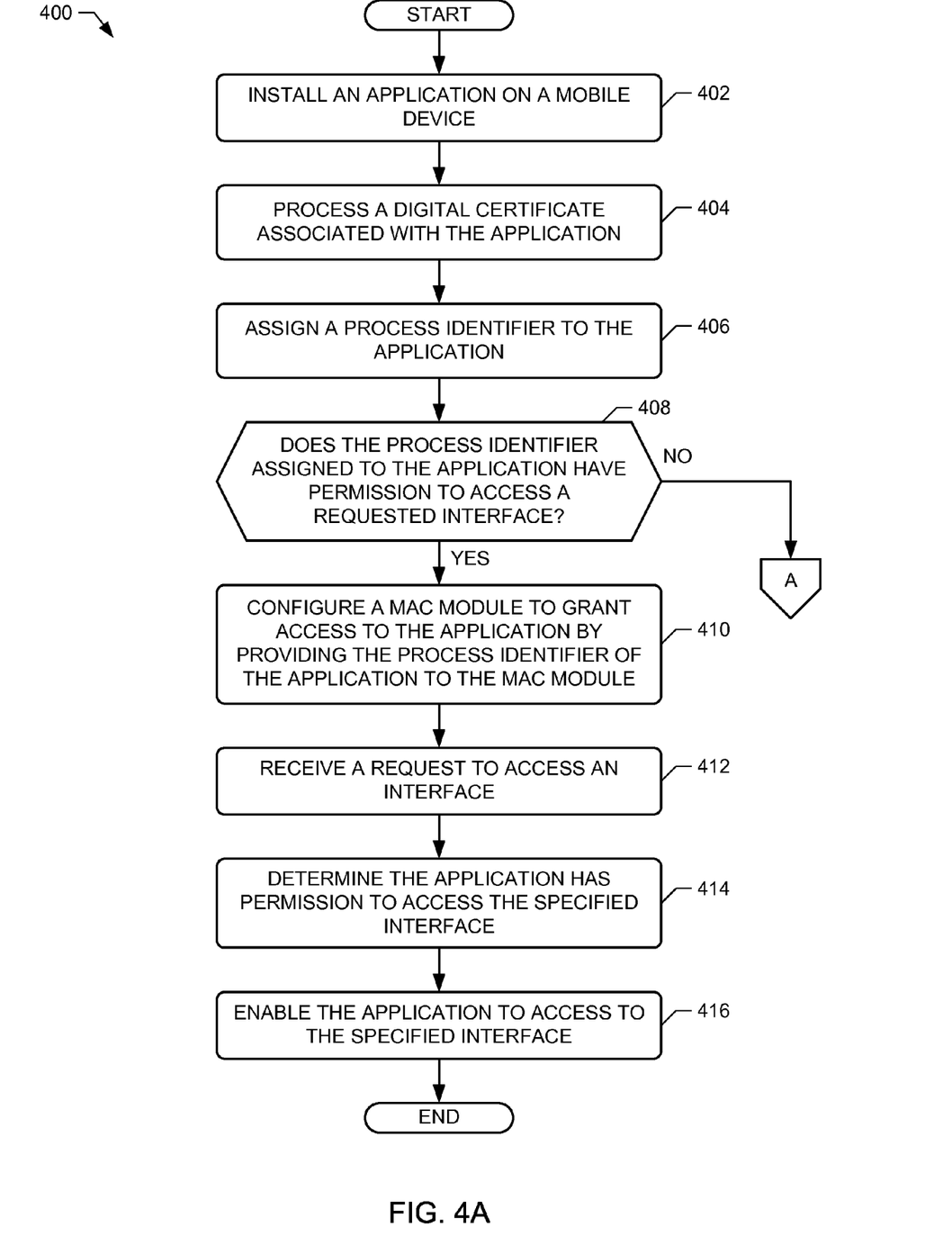
FIGS. 4A and 4B are flowcharts representative of example machine-accessible instructions, which may be executed to implement the App Policy Engine of FIGS. 1-3.
Figure 4B:
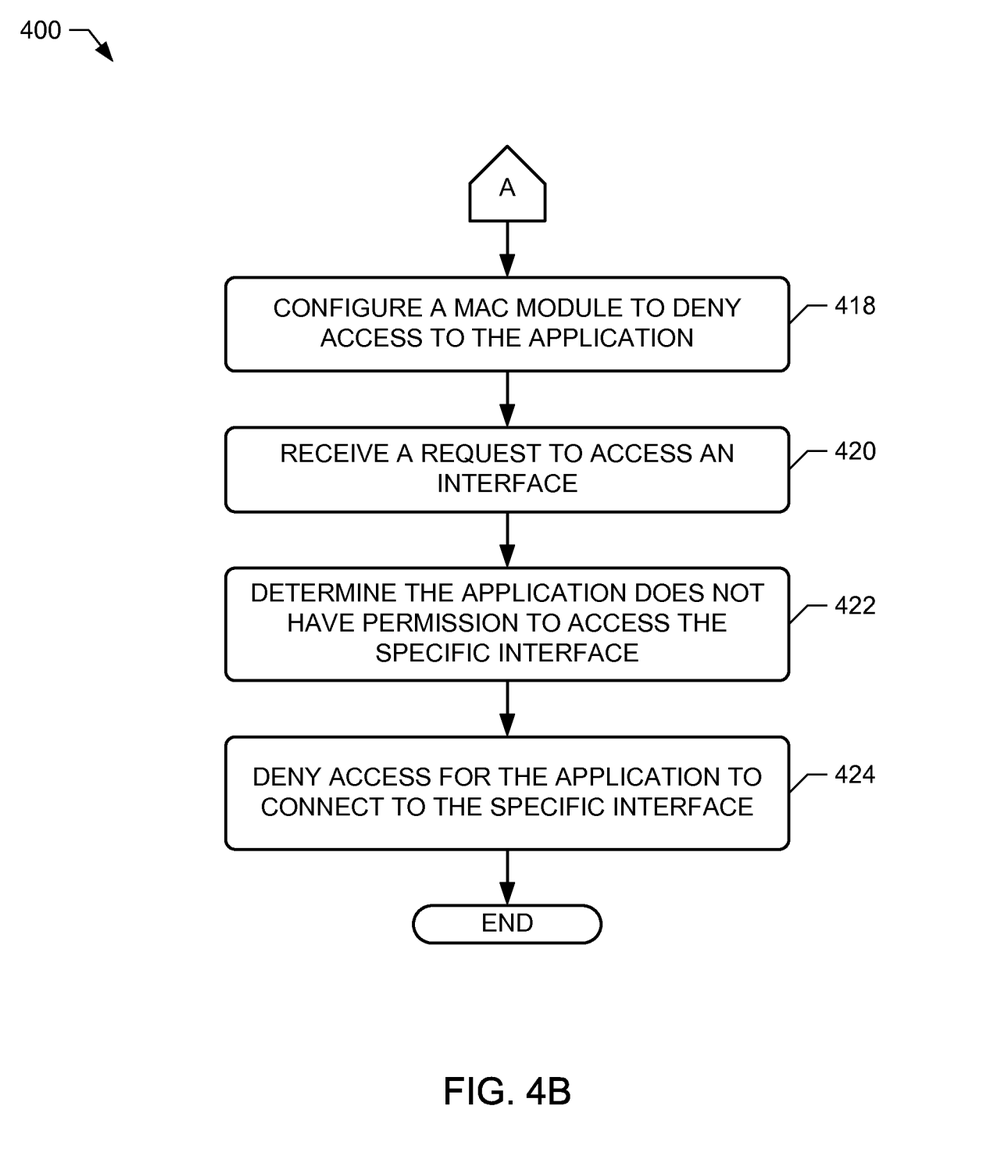

FIGS. 4A and 4B depict example flow diagrams representative of processes that may be implemented using, for example, computer readable instructions that may be used to control privileges of mobile device applications. The example processes of FIGS. 4A and 4B may be performed using a processor, a controller and/or any other suitable processing device. For example, the example processes of FIGS. 4A and 4B may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIGS. 4A and 4B may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 4A and 4B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 4A and 4B may be implemented manually or as any combination(s) of any of the foregoing techniques, for example, any combination of firmware, software, discrete logic and/or hardware. Further, although the example processes of FIGS. 4A and 4B are described with reference to the flow diagrams of FIGS. 4A and 4B, other methods of implementing the processes of FIGS. 4A and 4B may be employed. For example, the order of execution of the blocks may be changed, and/or some of the blocks described may be changed, eliminated, sub-divided, or combined. Additionally, any or all of the example processes of FIGS. 4A and 4B may be performed sequentially and/or in parallel by, for example, separate processing threads, processors, devices, discrete logic, circuits, etc.

The example process 400 of FIGS. 4A and 4B controls privileges of mobile device applications via the App Policy Engine 104 of FIGS. 1-3. While the example process 400 provides access control for an application, the example process 400 may provide access control for multiple applications attempting to access device and/or network interfaces on a mobile device. Further, the example process 400 may provide access control for application(s) attempting to access multiple wireless networks, VPNs, and/or host service platforms. Further, while the example process 400 provides access control, the example process 400 may provide execution control for any of the applications on a mobile device.

The example process 400 of FIG. 4A begins by installing an application on a mobile device (e.g., the mobile device 102 of FIGS. 1-2) (block 402). The example App Policy Engine 104 then processes a digital certificate associated with the application (block 404). In many examples, the application includes the digital certificate, which specifies if the application is authorized to be executed on the mobile device 102 and/or specifies which device and/or network interfaces the application is authorized to access. In other examples, the digital certificate may be processed from, for example, a SIM card within the mobile device 102. In yet other example, the App Policy Engine 104 may request the digital certificate from a certificate authority and/or a service provider prior to processing the certificate.

The example process 400 of FIG. 4A continues by the example application execution unit 302 and/or an operating system assigning a process identifier to the application (block 406). The example certificate processor 304 and/or the policy processor 308 then determines if the application is identified within a digital certificate as an authorized application (block 408). The example certificate processor 304 and/or the policy processor 308 may determine a relative amount of privileges granted to the application and identity which device and/or network interfaces the application is authorized to access. If privileges for the application are specified within the certificate, the example policy processor 308 next configures, for example, the MAC module 212 of FIGS. 2 and 3 (block 410). To configure the MAC module 212, the policy processor 308 sends to the MAC module 212 an instruction including the process identifier of the application to cause the MAC module 212 to authorize and/or grant privileges to the application to execute and/or access device and/or network interfaces. The privileges may also specify that the application may access a VPN, a wireless network, and/or a host service platform. Additionally, if the application is associated with a digital certificate, the example certificate processor 304 stores an identifier of the application and/or the corresponding process identifier to the example database 306.

The example process 400 of the illustrated examples continues by the VPN client 210 receiving a request from the mobile device 102 that the application is attempting to execute and/or access a wireless network, VPN, and/or host service platform (e.g., access a device and/or network interface) (block 412). The example MAC module 212 uses the process identifier of the application to determine that the application has permission and/or is authorized to access the specified interface (block 414). The example network tunnel 217 may also create a VPN tunnel from the VPN client 210 to an appropriate wireless hardware interface of the mobile device 102. The example MAC module 212 then enables the application to access the specified interface by allowing communications associated with the application to propagate through the VPN tunnel (block 416). The example process 400 then terminates. In other examples, the example process 400 may return to detecting that an application is installed on the mobile device 102 (block 402).

However, if the example certificate processor 304 and/or the policy processor 308 identifies that the application is not included within a digital certificate as an authorized application (block 408), the example process 400 of FIG. 4B continues by the policy processor 308 configuring the MAC module 212 to deny execution access and/or interface access to the application (block 418). In some examples, the policy processor 308 may instruct the MAC module 212 to deny access by providing the process identifier of the application to the MAC module 212 with an instruction to deny communications associated with the process identifier. In other examples, the policy processor 308 may deny access to an application by not sending the process identifier of the application to the MAC module 212.

The example process 400 of the illustrated example continues by the VPN client 210 receiving a request from the mobile device 102 that the application is attempting to execute and/or access a device and/or network interface (block 420). The example MAC module 212 determines that the application is not authorized to execute and/or access the specified interface (block 422). The example MAC module 212 then denies the application access to connect to specified interface and/or to execute (block 424). The example process 400 then terminates. In other examples, the example process 400 may return to detecting that an application is installed on the mobile device 102 (block 402).

Figure 5:
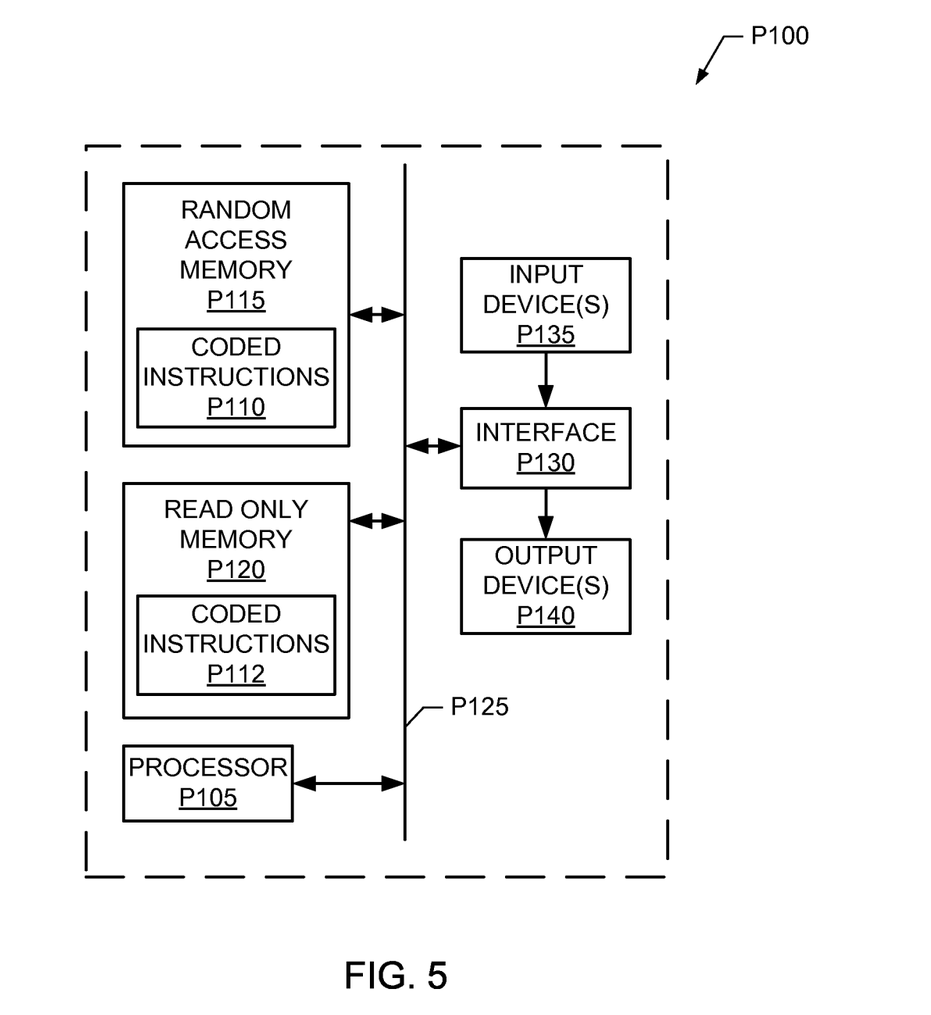
FIG. 5 is a schematic illustration of an example processor platform that may be used and/or programmed to execute the example processes and/or the example machine-accessible instructions of FIGS. 4A and/or 4B to implement any or all of the example methods, apparatus and/or articles of manufacture described herein.

FIG. 5 is a schematic diagram of an example processor platform P100 that may be used and/or programmed to implement the example VPN client 210, the example MAC module 212, the example application execution unit 302, the example certificate processor 304, the example database 306, the example policy processor 308 and/or more generally, the example App Policy Engine 104 of FIGS. 1-3. For example, the processor platform P100 can be implemented by one or more general-purpose processors, processor cores, microcontrollers, etc.

The processor platform P100 of the example of FIG. 5 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 4A and/or 4B to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example database 306 of FIG. 3.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method, comprising:
    assigning a process identifier to an application on a mobile device, the process identifier generated by an operating system of the mobile device, the mobile device having a first network interface and a second network interface different than the first network interface;
    determining via a digital certificate that the application is:
        authorized to be executed on the mobile device;
        authorized to access the first network interface of the mobile device; and
        unauthorized to access the second network interface of the mobile device;
    configuring a mandatory access control module of the mobile device to control access of the first and second network interfaces by providing the process identifier to the mandatory access control module;
    enabling the application to access the first network interface, wherein enabling the application to access the first network interface includes creating a virtual private network tunnel through the mobile device to a wireless network; and
    preventing the application from accessing the second network interface.

2. A method as defined in claim 1, wherein the virtual private network tunnel prevents unauthorized applications from accessing the first network interface.

3. A method as defined in claim 1, wherein the virtual private network tunnel prevents malicious applications from accessing a host server.

4. A method as defined in claim 1, wherein the virtual private network tunnel prevents the application from accessing the wireless network.

5. A method as defined in claim 1, further comprising determining via the digital certificate that the application is authorized to access a device interface of the mobile device.

6. A method as defined in claim 1, wherein configuring the mandatory access control module to control access includes transmitting the process identifier of the application to the mandatory access control module, the process identifier being included within an instruction informing the mandatory access control module that the application associated with the process identifier is authorized to access the first network interface and unauthorized to access the second network interface.

7. A method as defined in claim 1, further comprising determining via a second digital certificate that a second application is unauthorized to access the first network interface of the mobile device and is authorized to access the second network interface of the mobile device.

8. A method as defined in claim 4, wherein the application connects to a host server via a virtual private network on a cellular network.

9. A method as defined in claim 5, further comprising configuring the mandatory access control module to enforce access of the device interface to enable the application to access the device interface.

10. A mobile device, comprising:
    a first network interface;
    a second network interface;
    a memory having machine readable instructions and an application stored thereon;
    a processor to execute the machine readable instructions to perform operations comprising:
        determining via a digital certificate that the application is authorized to access the first network interface of the mobile device and unauthorized to access a second network interface of the mobile device;
        configuring a mandatory access control module of the mobile device to restrict access of the first and second network interfaces by providing a process identifier assigned to the application to the mandatory access control module;
        enabling the application to access the first network interface, wherein enabling the application to access the first network interface comprises creating a virtual private network tunnel; and
        preventing the application from accessing the second network interface.

11. The mobile device as defined in claim 10, wherein the operations further comprise assigning the process identifier to the application.

12. The mobile device as defined in claim 10, wherein the digital certificate is included within the application and indicates that the application has access privileges to access the first network interface.

13. The mobile device as defined in claim 11, wherein configuring the mandatory access control module to restrict access comprises conveying the process identifier of the application to the mandatory access control module.

14. The mobile device as defined in claim 12, wherein the application has a lower privilege than a second application, and the application is to utilize the second application to access the second network interface.

15. A tangible machine-accessible storage medium comprising instructions that, when executed, cause a machine to perform operations comprising:
    assigning a process identifier to an application on a mobile device;
    determining via a digital certificate that the application is:
        authorized to be executed on the mobile device;
        authorized to access a first device interface of the mobile device; and
        unauthorized to access a second device interface of the mobile device, the second device interface being different from the first device interface;
    configuring a mandatory access control module of the mobile device to control access to the first and second device interfaces by providing the process identifier to the mandatory access control module;
    enabling the application to access the first device interface, wherein enabling the application to access the first network interface comprises creating a virtual private network tunnel through the mobile device via the mandatory access control module; and preventing the application from accessing the second device interface.

16. A storage medium as defined in claim 15, wherein the operations further comprise determining via the digital certificate that the application is authorized to access a first network interface of the mobile device and unauthorized to access a second network interface of the mobile device.

17. A storage medium as defined in claim 15, wherein the operations further comprise enabling the application to access a host service platform by connecting to a virtual private network via the first network interface.

* * * * *